(12) United States Patent
Cheng et al.

(10) Patent No.: US 9,871,727 B2
(45) Date of Patent: Jan. 16, 2018

(54) ROUTING LOOKUP METHOD AND DEVICE AND METHOD FOR CONSTRUCTING B-TREE STRUCTURE

(71) Applicants: ZTE Corporation, Shenzhen (CN); ZTE MICROELECTRONICS TECHNOLOGY CO., LTD, Quangdong (CN)

(72) Inventors: Chen Cheng, Shenzhen (CN); Yu Li, Shenzhen (CN); Wei Zhang, Shenzhen (CN); Baokui Xu, Shenzhen (CN); Wei Chen, Shenzhen (CN); Yuanhang Sun, Shenzhen (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 14/917,773

(22) PCT Filed: May 21, 2014

(86) PCT No.: PCT/CN2014/078055
§ 371 (c)(1),
(2) Date: Jun. 22, 2016

(87) PCT Pub. No.: WO2015/032216
PCT Pub. Date: Mar. 12, 2015

(65) Prior Publication Data
US 2016/0294693 A1 Oct. 6, 2016

(30) Foreign Application Priority Data
Sep. 9, 2013 (CN) .......................... 2013 1 0408340

(51) Int. Cl.
*H04L 12/741* (2013.01)
*H04L 12/745* (2013.01)
*H04L 12/773* (2013.01)

(52) U.S. Cl.
CPC ............ *H04L 45/745* (2013.01); *H04L 45/60* (2013.01); *H04L 45/748* (2013.01)

(58) Field of Classification Search
CPC ......... H04L 45/00; H04L 45/48; H04L 45/60; H04L 45/742; H04L 45/745;
(Continued)

(56) References Cited

U.S. PATENT DOCUMENTS 5,261,088 A * 11/1993 Baird ................ G06F 17/30961
7,206,096 B1    4/2007 Sasaki et al.
(Continued)

FOREIGN PATENT DOCUMENTS

CN    101009656 A    8/2007
CN    101834802 A    9/2010

OTHER PUBLICATIONS

Ming-feng Tan, "An IPv6 Routing Lookup Algorithm for Large Route Tables Based on rage Representation B-tree", Journal of National University of Defense Technology, No. 5, vol. 27, May 31, 2005.
International Search Report for corresponding application No. PCT/CN2014/078055 filed on May 21, 2014; dated Sep. 3, 2014.

*Primary Examiner* — Mohamed Kamara
(74) *Attorney, Agent, or Firm* — Cantor Colburn LLP

(57) ABSTRACT

Provided are a routing lookup method and device, and a method for constructing a B-Tree structure, wherein the device includes a routing lookup algorithm software component, a routing update interface component and a routing lookup hardware component, the routing lookup algorithm software component is configured to execute software calculation for a routing entry and issue an entry update instruction, the routing update interface component is configured to control, after receiving the entry update instruction issued by the routing lookup algorithm software component, a data stream of the routing lookup hardware (Continued)

component according to an actual working state of the routing lookup hardware component, and write an updated entry into a memory of the routing lookup hardware component, and the routing lookup hardware component is configured to respond to a routing lookup request of a hardware system, and return a lookup result matched with a longest prefix to the hardware system.

7 Claims, 5 Drawing Sheets

(58) Field of Classification Search
CPC ..... H04L 45/748; H04L 12/28; H04L 12/701; H04L 12/741; H04L 12/745; H04L 12/747; G06F 15/173
See application file for complete search history.

(56) References Cited

U.S. PATENT DOCUMENTS

| | | | | |
|---|---|---|---|---|
| 2001/0042130 | A1* | 11/2001 | Brown | G06F 17/30955 709/238 |
| 2004/0052251 | A1* | 3/2004 | Mehrotra | H04L 45/00 370/389 |
| 2007/0091899 | A1* | 4/2007 | Ward | H04L 45/00 370/395.32 |
| 2008/0209077 | A1* | 8/2008 | Im | G06F 12/0661 710/9 |
| 2012/0096216 | A1* | 4/2012 | Lee | G06F 12/0246 711/103 |

* cited by examiner

US 9,871,727 B2

ROUTING LOOKUP METHOD AND DEVICE AND METHOD FOR CONSTRUCTING B-TREE STRUCTURE

TECHNICAL FIELD

The disclosure relates to the field of network switch, particularly to a routing lookup method and device, and a method for constructing a B-Tree structure.

BACKGROUND

With the rapid development of the Internet, an interface rate of a core router used for interconnection of backbone networks has reached 100 Gbps, and such a rate requires that the core router has a routing lookup rate as high as millions of times per second while supporting a routing table having a large capacity. Internet Protocol (IP) lookup requires acquisition of a longest prefix matching, and a software lookup method is no longer applicable as required by high speed lookup. In recent years, researchers have proposed many hardware lookup methods to improve lookup efficiency, prevailed by a Trie tree structure and a Ternary Content Addressable Memory (TCAM).

The Trie tree structure, which is the most widely used tree structure, is easy to implement a pipeline operation on hardware and beneficial to improvement of the throughput rate of routing lookup. However, the Trie tree structure has a certain limitation. A common Trie tree structure has a large number of pipeline levels, which results in a relatively long lookup delay. The number of pipeline levels may be greatly reduced by applying a routing lookup design with a multi-bit Trie tree structure, but a great amount of additional memory consumption will be caused, and such additional memory consumption is related to distribution of prefixes of a routing table, thus resulting in relatively large fluctuation of a routing table capacity of a routing lookup hardware design based on a multi-bit Trie tree, and a relatively low utilization rate of a memory space in worse routing distribution.

At present, there is no effective solution to solve the problem that a routing lookup solution in the related art has large memory consumption and affects routing lookup efficiency.

SUMMARY

Directed at the problem that a routing lookup solution in the related art has large memory consumption and affects routing lookup efficiency, embodiments of the disclosure provide a routing lookup method and device, and a method for constructing a B-Tree structure, so as to at least solve the technical problem above.

According to an aspect of the embodiment of the present disclosure, a routing lookup device is provided, comprising a routing lookup algorithm software component, a routing update interface component and a routing lookup hardware component, wherein the routing lookup algorithm software component is configured to execute software calculation for a routing entry and issue an entry update instruction; the routing update interface component is configured to control, after receiving the entry update instruction issued by the routing lookup algorithm software component, a data stream of the routing lookup hardware component according to an actual working state of the routing lookup hardware component, and write an updated entry into a memory of the routing lookup hardware component, and the routing lookup hardware component is configured to respond to a routing lookup request of a hardware system, and return to the hardware system a lookup result having a longest prefix matching, wherein the routing lookup hardware component is of a pipeline architecture.

In an example embodiment, the routing lookup algorithm software component comprises: an inserting operation sub-component, configured to respond to a routing insertion instruction of a routing forwarding system, and insert a routing entry into a B-Tree structure; a deleting operation sub-component, configured to respond to a routing deletion instruction of the routing forwarding component, and delete the routing entry from the B-Tree structure; a software table entry memory management sub-component, configured to manage node data in a routing lookup algorithm and entry data of a result table; and an update hardware operation sub-component, configured to record in a cache, a B-Tree node and a result table entry changed in an inserting operation of the inserting operation sub-component or a deleting operation of the deleting operation sub-component, convert a software data format of the tree node into a hardware data format after the inserting operation or the deleting operation, and successively write converted hardware data and a corresponding hardware mapping address into the routing update interface component through a software and hardware interaction interface.

In an example embodiment, the routing lookup hardware component comprises: a lookup logic sub-component and a memory sub-component, wherein the lookup logic sub-component is configured to transmit root node address information in the memory sub-component and lookup key value information to a lookup pipeline of a first level of a tree structure after receiving the routing lookup request of the hardware system, then judge whether a root node address is an address of a node of a current level, and when a judgment result is that the root node address is the address of the node of the current level, initiate a node reading request to the memory sub-component and wait for the memory sub-component to return node information, and when the judgment result is that the root node address is not the address of the node of the current level, keep current node information unchanged and access a pipeline of next level; and when the judgment result is that the root node address is the address of the node of the current level, the lookup logic sub-component is further configured to compare the node information with a key value, to judge whether a routing entry is hit, and when a judgment result is that the routing entry is hit, replace a previous hit result with a record result corresponding to the hit routing entry; and the memory sub-component comprises a plurality of independent memory spaces respectively corresponding to lookup logic layers of the tree structure.

In an example embodiment, the routing update interface component comprises: a cache sub-component, configured to receive node data, result table entry data and a corresponding hardware mapping address through the software and hardware interaction interface; and a logic processing sub-component configured to update, according to a working state of the lookup logic sub-component of the routing lookup hardware component, an entry update content of the cache sub-component into the memory sub-component of the routing lookup hardware component.

In an example embodiment, the inserting operation sub-component comprises: a tree structure management element, configured to control an access sequence of new entries in the B-Tree structure; a node parsing and comparison element, configured to control an ordered query of the new entries in the B-Tree structure together with the tree structure management element, and find an insertion position; a node splitting operation element, configured to split, when a new entry needs to be inserted into a full node, the full node; and a result table update element, configured to store result information carried by the new entry into a result table, and record an address of the result information in a corresponding position of a node where the new entry locates.

In an example embodiment, the software table entry memory management sub-component comprises: a software node management element, configured to manage node allocation in the routing lookup algorithm and rapidly allocate and manage a software node through a memory management algorithm; a software result table management element, configured to manage entry address allocation of a result table in the routing lookup algorithm and rapidly allocate and manage the result table through the memory management algorithm; and a hardware address mapping management element, configured to perform software address mapping for an actual memory space of hardware, and manage a hardware node and a result table according to a memory management algorithm of software, wherein software nodes are in one-to-one correspondence with hardware nodes, and software result tables are in one-to-one correspondence with hardware result tables.

According to the other aspect of the embodiment of the present disclosure, a routing lookup method is provided, comprising: defining the number M of orders and a maximum height N of a B-Tree structure, as well as the maximum number of nodes and the maximum number of entries of result tables of each layer of the B-Tree structure, determining a corresponding number of pipeline levels of hardware, a space occupied by the nodes of each layer and a space occupied by the result tables of each layer, to construct the B-Tree structure; and executing a routing lookup operation based on the B-Tree structure.

According to another aspect of the embodiment of the present disclosure, a method for constructing a B-Tree structure having a hardware lookup structure growing from bottom to top is provided, the method comprising: defining, according to an actual routing table capacity requirement and a time delay requirement, the number M of orders of the B-Tree structure and a maximum height N required by the B-Tree structure, and setting a corresponding number N+1 of pipeline levels according to the maximum height N; and defining the maximum number of nodes of each layer of the B-Tree structure according to an algorithm filling condition, setting a corresponding memory space according to the maximum number of nodes of each layer, and setting a memory space of a result table according to the actual routing table capacity requirement The problem that a routing lookup solution in the related art has large memory consumption and affects routing lookup efficiency is solved by the embodiments of the disclosure. The technical solution of the embodiments of the disclosure designs a software algorithm component, a hardware data structure, an updating flow, a lookup pipeline structure and a memory structure of a routing lookup system as a whole, thus requirements of high performance lookup of a large capacity routing table can be satisfied, a hardware pipeline operation can be implemented with less pipeline levels, and the capacity is not sensitive to distribution of routing prefixes.

The description above is only a summary of the technical solution of the embodiments of the disclosure. Specific implementation modes of the embodiments of the disclosure will be specifically illustrated below so that the technical means of the embodiments of the disclosure can be understood more clearly, and thus can be implemented according to the content of the specification, and so that the aforementioned and other purposes, characteristics and advantages of the embodiments of the disclosure can become more apparent and more easily understood.

DETAILED DESCRIPTION OF THE EMBODIMENTS

The embodiments of the disclosure provide a routing lookup method and device, and a method for constructing a B-Tree structure so as to solve the problem that a routing lookup solution in the related art has large memory consumption and affects routing lookup efficiency. The embodiments of the disclosure will be further expounded below with reference to the accompanying drawings and embodiments. It should be understood that the specific embodiments described herein are only used for explaining the embodiments of the disclosure, instead of limiting the embodiments of the disclosure.

An embodiment of the disclosure provides a routing lookup method based on a B-Tree and a piece of hardware architecture, so that a large capacity forwarding table can be supported and high speed lookup can be performed. Most importantly, the method provided by the embodiment of the disclosure is able to implement a hardware pipeline operation with less pipeline levels, and the capacity is not sensitive to distribution of routing prefixes. The B-tree, which is widely set as a software algorithm of file management of a database, is characterized by a tree node having M-1 keywords and M child nodes. The depth of the B-Tree is decided by the number M of orders and the number of the keywords, and is independent of distribution of the keywords. These characteristics enable the B-Tree to overcome the disadvantages of the Trie tree structure in the related art and implement a routing lookup design which has less pipeline levels and is not sensitive to distribution of routing prefixes.

It needs to be noted that it is necessary to ensure that a returned result is a matching result of a longest prefix when routing lookup is performed by applying the B-tree. Since lookup backtracking can be hardly implemented in the hardware pipeline operation, special processing is required for a routing lookup algorithm of the B-tree. There are many operating methods disclosed for such processing. For example, a parental prefix may be duplicated to acquire a plurality of copies which are combined to all child prefixes of the parental prefix, or a method of combining a parental prefix and a child node of the upmost layer of the tree structure is applied. The disclosure utilizes the method of combining the parental prefix and the child node of the upmost layer of the tree structure to design a routing lookup method and device based on a B-tree.

Figure 1:
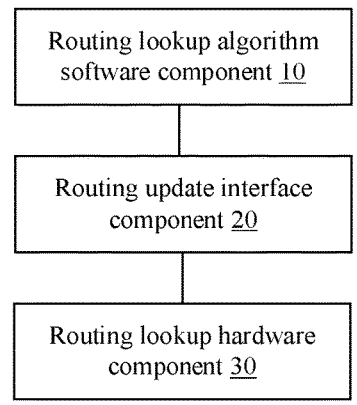
FIG. 1 is a structural block diagram of a routing lookup device according to an embodiment of the disclosure.

An embodiment of the disclosure provides a routing lookup device. FIG. 1 is a structural block diagram of a routing lookup device according to an embodiment of the disclosure. As shown in FIG. 1, the device includes: a routing lookup algorithm software component 10, a routing update interface component 20 and a routing lookup hardware component 30. Each component will be introduced in details below.

The routing lookup algorithm software component 10 is configured to execute software calculation for a routing entry and issue an entry update instruction.

The routing update interface component 20 is connected to the routing lookup algorithm software component 10 and configured to control, after receiving the entry update instruction issued by the routing lookup algorithm software component 10, a data stream of the routing lookup hardware component 30 according to an actual working state of the routing lookup hardware component 30, and write an updated entry into a memory of the routing lookup hardware component 30.

The routing lookup hardware component 30 is connected to the routing update interface component 20 and configured to respond to a routing lookup request of a hardware system, and return to the hardware system a lookup result having a longest prefix matching, wherein the routing lookup hardware component 30 is of a pipeline architecture.

A software algorithm component, a hardware data structure, an updating flow, a lookup pipeline structure and a memory structure of a routing lookup system are designed as a whole by means of the present embodiment, thus requirements of high performance lookup of a large capacity routing table can be satisfied, a hardware pipeline operation can be implemented with less pipeline levels, and the capacity is not sensitive to distribution of routing prefixes.

Design of the components will be described in details below.

Figure 2:
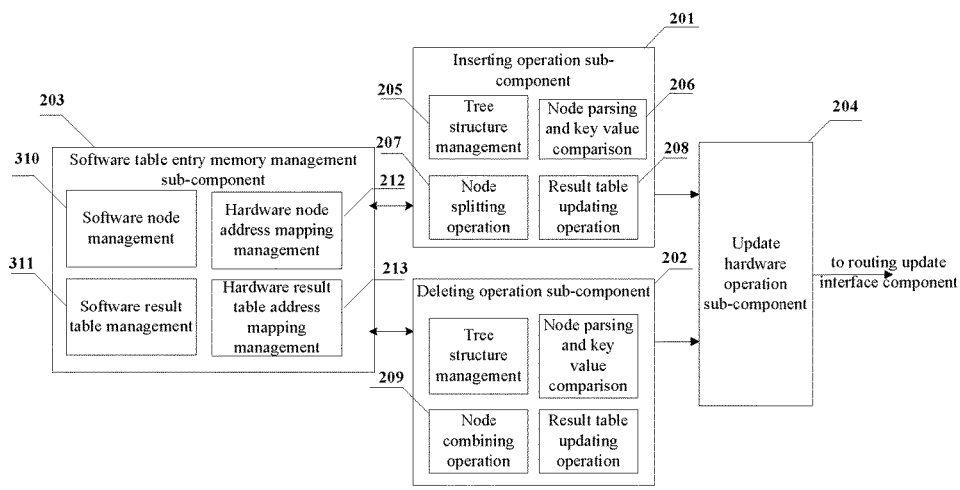
FIG. 2 is an architecture diagram of a routing lookup algorithm software component according to an embodiment of the disclosure.

FIG. 2 is an architecture diagram of a routing lookup algorithm software component) according to an embodiment of the disclosure. As shown in FIG. 2, the whole routing lookup algorithm software component is implemented based on the aforementioned B-Tree algorithm that does not need to perform lookup backtracking, and an overall framework is divided into 4 parts: an inserting operation sub-component (201), a deleting operation sub-component (202), a software table entry memory management sub-component (203) and an update hardware operation sub-component (204).

The inserting operation sub-component (201) mainly works to respond to a routing insertion instruction of a routing forwarding system, and insert a issued routing entry into a B-Tree structure. A tree structure management sub-component (205) in the component, which controls an access sequence of new entries in the tree structure, acts jointly with a node parsing and comparison sub-component (206) to ensure an ordered query of the new entries in the B-Tree structure and find an insertion position. A node splitting operation sub-component (207) mainly functions to perform, when a new entry needs to be inserted into a full node, a B-Tree splitting operation on the full node. The splitting operation may be triggered when the new entry is inserted. After the new entry is inserted into the tree structure successfully, a result table update sub-component (208) stores result information carried by the new entry into a result table, and records an address of the result in a corresponding position of a node where the new entry locates.

The deleting operation sub-component (202) mainly functions to respond to a routing deletion instruction of the routing forwarding component, and delete the issued routing entry from the B-Tree structure. A tree structure management sub-component and a node parsing and comparison sub-component in the component have the same functions as the tree structure management sub-component and a node parsing and comparison sub-component of the inserting operation sub-component (201), thereby ensuring an ordered query of deleted entries in the B-Tree structure, finding a matched target entry and deleting the matched target entry. A node combining sub-component (209) mainly functions to, when key values in a node is too small after an entry is deleted from the node, combine the node with a brother node of the node. The operation of combining the nodes may be triggered when the entry is deleted. After the entry is deleted, a result table update component deletes an actual result corresponding to the entry from a result table.

The software table entry memory management sub-component (203) mainly functions to manage nodes and result tables in a routing lookup algorithm, including the following contents: a software node management sub-component (210), a software result table management sub-component (211), a hardware node address mapping management sub-component (212) and a hardware result table address mapping management sub-component (213).

The software node management sub-component (210) functions to manage node allocation in the routing lookup algorithm and rapidly allocate and manage a software node through a memory management algorithm.

The software result table management sub-component (211) functions to manage entry address allocation of a result table in the routing lookup algorithm and rapidly allocate and manage the result table through the memory management algorithm.

The hardware node address mapping management sub-component (212) and the hardware result table address mapping management sub-component (213) perform address mapping of an actual memory space of hardware in a software component, and manage a hardware node and a result table according to a memory management algorithm of software. It is required that software nodes are in one-to-one correspondence with hardware nodes, and software result tables are in one-to-one correspondence with hardware result tables. Therefore, as a matter of fact, a software node not only corresponds to a software memory node address, but also corresponds to an actual hardware memory node address.

The update hardware operation sub-component (204) mainly functions to record in a cache, a B-Tree node and a result table entry changed in an inserting operation or a deleting operation, convert a software data format of the tree node into an agreed hardware data format after the inserting operation or the deleting operation, and successively write converted hardware data and a corresponding hardware mapping address into a routing entry update component through a software and hardware interaction interface (which may include but is not limited to a LocalBus interface or a PCIe interface). The significance of the component is to reduce interface interaction operations of software and hardware, save update time, and reduce the impact of entry update reduction on an actual hardware lookup pipeline.

Based on the description of the routing lookup algorithm software component, the present embodiment provides an example implementation mode. That is, the routing lookup algorithm software component may include: an inserting operation sub-component, configured to respond to a routing insertion instruction of a routing forwarding system, and insert a routing entry into a B-Tree structure; a deleting operation sub-component, configured to respond to a routing deletion instruction of the routing forwarding component, and delete the routing entry from the B-Tree structure; a software table entry memory management sub-component, configured to manage node data in a routing lookup algorithm and entry data of a result table; and an update hardware operation sub-component, configured to record in a cache, a B-Tree node and a result table entry changed in an inserting operation of the inserting operation sub-component or a deleting operation of the deleting operation sub-component, convert a software data format of the tree node into a hardware data format after the inserting operation or the deleting operation, and successively write converted hardware data and a corresponding hardware mapping address into the routing update interface component through a software and hardware interaction interface.

In an example embodiment, the inserting operation sub-component may include: a tree structure management element, configured to control an access sequence of new entries in the B-Tree structure; a node parsing and comparison element, configured to control an ordered query of the new entries in the B-Tree structure together with the tree structure management element, and find an insertion position; a node splitting operation element, configured to split, when a new entry needs to be inserted into a full node, the full node; and a result table update element, configured to store result information carried by a new entry into a result table, and record an address of the result information in a corresponding position of a node where the new entry locates.

In an example embodiment, the software table entry memory management sub-component may include: a software node management element, configured to manage node allocation in the routing lookup algorithm and rapidly allocate and manage a software node through a memory management algorithm; a software result table management element, configured to manage entry address allocation of a result table in the routing lookup algorithm and rapidly allocate and manage the result table through the memory management algorithm; and a hardware address mapping management element, configured to perform software address mapping for an actual memory space of hardware, and manage a hardware node and a result table according to a memory management algorithm of software, wherein software nodes are in one-to-one correspondence with hardware nodes, and software result tables are in one-to-one correspondence with hardware result tables.

The routing lookup algorithm software component, which operates on a Central Processing Element (CPU), may be a B-Tree algorithm software program compiled by an advanced algorithm language (such as C, C++ language). The routing lookup algorithm software component uses a routing entry update instruction (a routing entry insertion, or deletion instruction) which is generally from a protocol platform or a driver, as an input source of the routing lookup algorithm software component. When an update instruction is issued to the routing lookup algorithm software component, the routing lookup algorithm software component performs an inserting operation on the update instruction according to a B-Tree algorithm, and after the inserting operation, writes all changed tree nodes involved in the calculation into the routing update interface component at one time according to an agreed hardware format through a software and hardware interaction interface (which may include, but is not limited to a PCIe interface, a LocalBus interface and so on).

Figure 3:
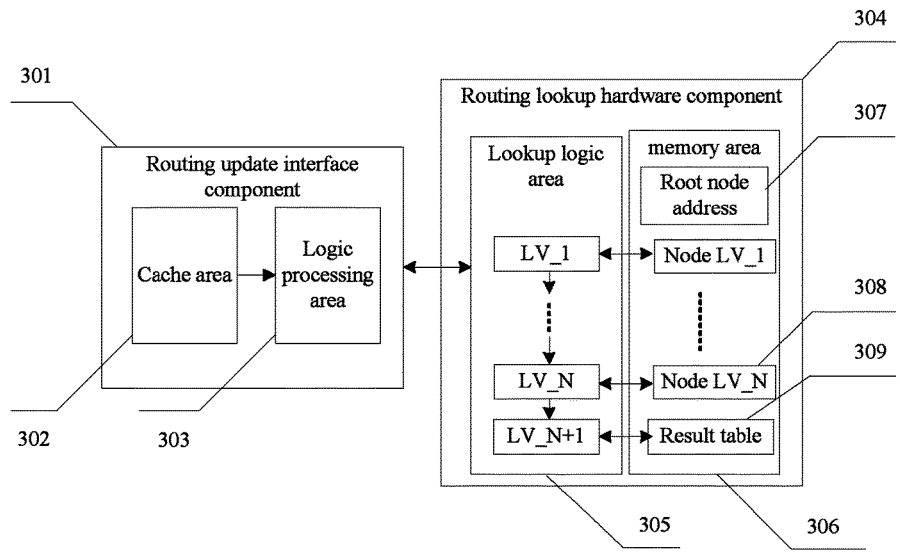
FIG. 3 is an architecture diagram of hardware related components of a routing lookup device according to an embodiment of the disclosure.

FIG. 3 is an architecture diagram of hardware related components of a routing lookup device according to an embodiment of the disclosure. As shown in FIG. 3, the hardware related components include a routing update interface component and a routing lookup hardware component, wherein the routing update interface component (201) is a hardware component, comprising two parts, i.e. a cache area (302) and a logic processing area (303). As shown in FIG. 3, the cache area is configured to store update node information written by an algorithm component, and the logic processing area writes, according to a related state of the routing lookup hardware component, update node data into a node memory of the hardware component according to a certain sequence. Specific introduction will be provided below.

The cache area (302) mainly functions to receive node data, result table entry data and corresponding hardware addresses written by storage software through a software and hardware interaction interface, and these data have been converted into a hardware data format by software.

The logic processing area (303) mainly functions to update, according to an actual working state of a lookup logic sub-component (305) in the routing lookup hardware component, an entry update content of the cache area to a memory area (306) of the routing lookup hardware component in real time. A key point of the logic processing area is that lookup pipelines of a B-Tree algorithm are correlated. In other words, a node accessed by a pipeline of a next level is a part in a lookup result of a pipeline of a pipeline of a previous level, and since a pipeline of each level may have a lookup request moment, it is necessary to update a hardware memory when it is appropriate. Otherwise, a miss hit or even an error hit may be caused in some lookup. One of the simplest processing solution is that: after an update request appears, the logic processing area controls a lookup pipeline logic first to block all lookup requests at an entrance of the lookup logic area (305), so that all lookup requests are temporarily cached in a cache First Input First Output (FIFO) queue. Subsequently, when the lookup requests of all levels in the lookup pipeline logic are completely responded and results are returned, there is no any lookup request data packet in a lookup logic at the moment, and a node and a result table that need to be updated are read from the cache area, and written into the memory area (306) according to corresponding hardware addresses. Finally, after all updating operations are completed, the lookup requests of the lookup logic area are unlocked, and the lookup logic recovers to a normal operating state.

Based on the description of a hardware related component (the routing update interface component) of the routing lookup device, the present embodiment provides an example implementation mode. That is, the routing update interface component includes a cache sub-component, configured to receive node data, result table entry data and a corresponding hardware mapping address through the software and hardware interaction interface; and a logic processing sub-component configured to update, according to a working state of the lookup logic sub-component of the routing lookup hardware component, an entry update content of the cache sub-component into the memory sub-component of the routing lookup hardware component.

The other hardware related component (the routing lookup hardware component) of the routing lookup device will be introduced below. The routing lookup hardware component (304) is a major component of hardware routing lookup and is in a pipeline design, and mainly comprises a lookup logic area (305) and a memory area (306).

The lookup logic area (305) is in a pipeline design, and a pipeline of each level is provided with a lookup logic, and information in the pipeline includes: lookup key value information, a node address, hit information (an address in a result table) and so on. A lookup request of hardware is transmitted to a pipeline of a first level first by a hardware interface. In the meanwhile, a root node address (307) stored in the hardware component is acquired. A pipeline of each level accesses a memory area corresponding to a current level according to a node address and acquires corresponding node information (lookup comparison will not be performed by the current level when an accessed node is not a node of the current level), then parses key value information in a node, compares the key value information with a lookup key value transmitted by a previous level to acquire a comparison result (new hit information is acquired when there is a hit and a hit failure is outputted otherwise), and acquires a node address that needs to be accessed by a pipeline of the next level. A pipeline of the final level accesses the result table once according to the hit information, reads a corresponding hit result in the result table, and returns the hit result to a requesting terminal through a hardware interface.

The memory area (306) is designed into blocks, each of which corresponds to a pipeline. A node space corresponding to a pipeline of each level is defined by an algorithm according to an actual requirement. A memory of each level is fixed by hardware design. The root node address (307) is a register and configured by a software component to mark a root node location of a tree structure. The result table (309) corresponds to a lookup pipeline of the final level, and a space actually occupied by the result table is defined by an algorithm according to an actual table entry capacity requirement.

The memory area (306) is an important data memory area in the routing lookup hardware component, having a structure as shown in FIG. 3. Memory regions in the memory area are independent, and include a root node address region, a node region of each layer, and a result table region. The root node address, which is configured to store an address of a root node of a B-Tree structure, may be a node of any layer. Tree node regions of layers are independent and not overlapped with other tree node regions, thus avoiding the conflict of simultaneous access of lookup pipelines. The result table region is also an independent region, and accessed by the final level of lookup pipelines.

The root node address may be implemented by a register. A node and a result table region of each layer may be implemented by a Static Random-Access Memory (SRAM), a Dynamic Random-Access Memory (DRAM) or other types of memories according to a required actual memory space size and an access delay requirement.

Based on the description of the hardware related component (the routing lookup hardware component) of the routing lookup device, the present embodiment provides an example implementation mode. That is, the routing lookup hardware component may include: a lookup logic sub-component configured to transmit root node address information in the memory sub-component, and lookup key value information to a lookup pipeline of a first level of a tree structure after receiving the routing lookup request of the hardware system, then judge whether a root node address is an address of a node of a current level, and when a judgment result is that the root node address is the address of the node of the current level, initiate a node reading request to the memory sub-component and wait for the memory sub-component to return node information, and when the judgment result is that the root node address is not the address of the node of the current level, keep current node information unchanged, and the lookup logic sub-component is further configured to compare the node information with a key value, to judge whether a routing entry is hit, and when a judgment result is that the routing entry is hit, replace a previous hit result with a record result corresponding to the hit routing entry; and a memory sub-component, comprises a plurality of independent memory spaces respectively corresponding to lookup logic layers of the tree structure.

Figure 4:
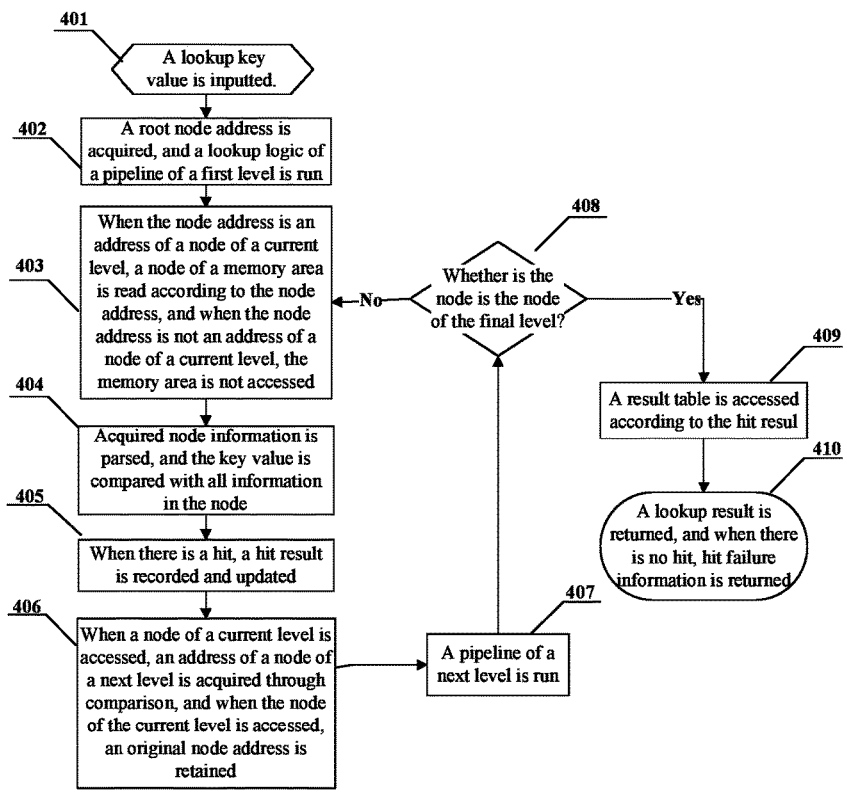
FIG. 4 is a flowchart of a hardware lookup pipeline according to an embodiment of the disclosure.

It may be learned from FIG. 3 that the lookup logic area is a major component for implementing a hardware lookup pipeline. There are N+1 levels of pipelines in total, wherein layers from LV_1 to LV_N are tree node lookup logic layers, and layer LV_N+1 is a result table lookup logic layer. Each lookup logic layer corresponds to an independent memory space in the memory area, thereby ensuring that there is no access conflict of the layers to the memory area. A lookup flow of the lookup logic area will be introduced below. FIG. 4 is a flowchart of a hardware lookup pipeline according to an embodiment of the disclosure. As shown in FIG. 4, the flow includes the following steps (Step 401 to Step 410).

Step 401: The routing lookup hardware component receives an inputted lookup request.

Step 402: Lookup key value information and root node address information in the memory area are simultaneously transmitted to a lookup pipeline of a first level.

Step 403: Whether a root node address is an address of a node of a current level is judged firstly in a logic of the pipeline, and when the root node address is the address of the node of the current level, a node reading request is initiated to a memory to wait for the memory to return node data, and when the root node address is not the address of the node of the current level, the request is not initiated to the memory, and current node information is kept unchanged.

Step 404: Acquired node information is parsed and compared with a key value.

Step 405: When a node of a current level it not accessed, parsing and comparison is not required, and it is only necessary to beat and wait. When a comparison result indicates that there is a hit, a previous hit result is replaced with a result record corresponding to a hit routing entry.

Step 406: When the node of the current level is not accessed, recording is not required, and it is only necessary to beat and wait. When comparison has been performed, a node address of next level that needs to be accessed is acquired from a comparison result and recorded in a node address. When the node of the current level is not accessed, the current node information is kept unchanged.

Step 407: Key value information carried by the pipeline, the node address and the hit result are searched to enter a processing logic of a pipeline of the next level.

Step 408: When the pipeline of the next level is not the pipeline of the final level, a process is the same as the flow of step 403 to Step 407, and when the pipeline of the next level is the pipeline of the final level, a processing logic of accessing a result table is performed.

Step 409: In the pipeline level of the result table, the logic will access the result table of the memory area according to a hit result (a result table entry address) to acquire an actual hit result, and when hitting fails, the result table is accessed, and information of a hit failure is outputted.

Step 410: The actual hit result is returned by a hardware interface, and when the hitting fails, the information of the hit failure is returned.

Detailed introduction will be provided below by a specific embodiment.

The present embodiment includes description of an insertion flow and a deletion flow of a routing prefix. It is assumed that the number M of orders of a B-Tree is 3, and there are at most 2 groups prefixes and 3 child node pointers in each tree node.

Figure 5:
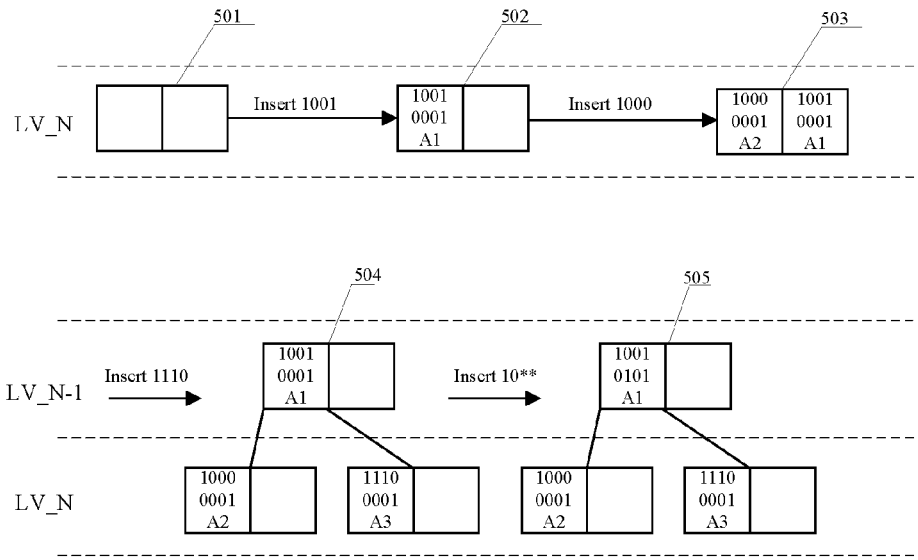
FIG. 5 is a flowchart of insertion of a routing prefix according to an embodiment of the disclosure.

FIG. 5 is a flowchart of insertion of a routing prefix according to an embodiment of the disclosure. As shown in FIG. 5, an initial condition (501) is that a routing table is empty, and there is actually no any prefix in a memory area of a routing lookup hardware component. A default empty node is used as an example in the figure, located at the bottom layer LV_N of lookup pipelines. At the moment, a root node address register may point to an address of the default empty node.

Firstly, a 4-bit prefix 1001 is inserted, as shown by 502. The prefix is inserted to a first empty bit of an initial node. The fourth bit of a vector marking the length of the prefix is 1, denoted by 0001, representing that the length of the prefix is 4. In the meanwhile, a corresponding result is stored in a result table address A1, and A1 is stored in the node.

Subsequently, a prefix 1000 is inserted, as shown by 503. Since 1000 is smaller than 1001, the prefix is inserted in the first empty bit of the initial node, a vector marking the length of the prefix is 0001, and in the meanwhile, a corresponding result is stored in a result table address A2.

A prefix 1110 is inserted, as shown by 504. Since the node is full at the moment, it is necessary to split the node, thus generating a new root node and a new brother node. The new root node locates at layer LV_N-1, while the new brother node locates at layer LV_N. A prefix 1001/0001/A1 is stored in the root node, a prefix 1000/0001/A2 is stored in a left child node of the root node, and a prefix 1000/0001/A3 is stored in a right child node. At the moment, a layer is added to the tree structure and it is necessary to update and point the root node address to a new root node (the node where 1001 locates).

A prefix 10 is inserted, as shown by 505. Since 10 is a parental prefix of the prefix 1001 in the root node, an applied algorithm needs to keep the parental prefix combined in a child prefix of the upmost layer. Therefore, 10 is marked on the vector of the prefix 1001. Since the length of the prefix 10 is 2, the second bit of the vector of 1001 is marked as 1. At the moment, the vector of 1001 is changed into 0101, to indicate two prefix lengths (2 and 4) at the same time. A result corresponding to 10** is also stored in the address A1. At the moment, there are two lookup results in the address A1.

Figure 6:
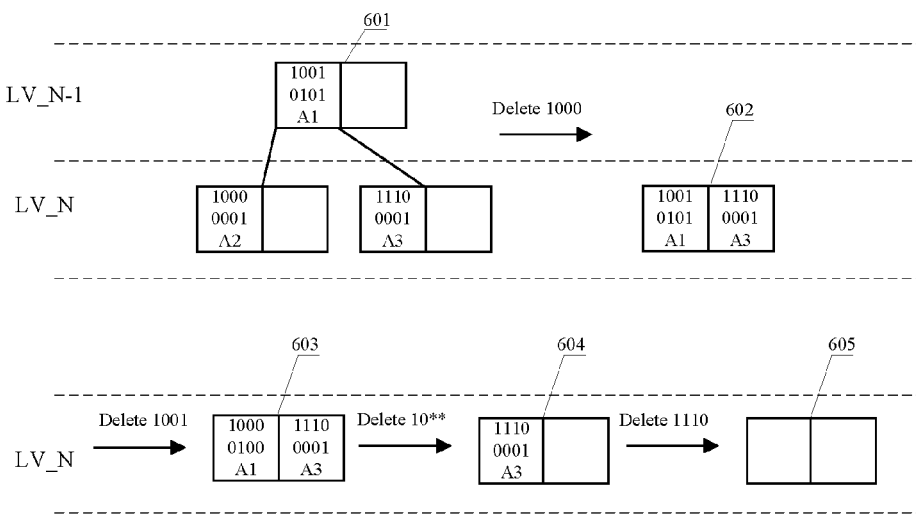
FIG. 6 is a flowchart of deletion of a routing prefix according to an embodiment of the disclosure.

FIG. 6 is a flowchart of deletion of a routing prefix according to an embodiment of the disclosure. As shown in FIG. 6, the finial insertion result that has been constructed is taken as an initial state (601) of the deletion flow.

First, 1000 is deleted, as shown by 602. The prefix 1000 in the node and a result content corresponding to the address A2 are deleted. Since the node will become empty by the deletion of 1000, it is necessary to perform a operation for combining nodes. An operation result is that a root node of layer LV_N-1 is deleted, and a remaining node of layer LV_N serves as a root node, wherein the prefix 1001/0101/A1 and 1110/0001/A3 are stored in turn. At the moment, since the root node has changed, it is necessary to point the root node address to the new root node.

Subsequently, 1001 is deleted, as shown by 603. The prefix 1001 in the node is deleted. However, since the parental prefix 10** of the prefix is still stored in the prefix, the position of the prefix should not be empty, and the prefix of the prefix position is changed into 1000, the vector is changed into 0100 (representing a prefix having a length of 2), and a result corresponding to 1000 in the address A1 is deleted.

10** is deleted, as shown by 604. The prefix 1000/0100/A1 in the node is deleted, and a result of the address A1 in the result table is deleted. The prefix 1110/0001/A3 is moved to the first position of the node.

Finally, 1110 is deleted, as shown by 605. The prefix 1110/0001/A3 in the node is deleted, and a result of the address A3 in the result table is deleted. At the moment, the routing table is empty.

Data formats involved in the present embodiment mainly include a node data format and a result table data format. Node data includes 4 parts, i.e. a key value, a markup vector, a result table address, and a pointer of a next level. The key value is a routing prefix in a routing table. The markup vector is a markup vector for making an entry having a different prefix length in the same prefix in the B-Tree algorithm. The result table address is address information of a lookup result corresponding to a current routing entry in a result table. The pointer of the next level is a node address of the next level that needs to be accessed after lookup of a current level.

A hardware lookup structure involved in the present embodiment is a B-Tree structure growing from bottom to top. First, the number M of orders of the B-Tree and the maximum height N required by the B-Tree are defined according to an actual routing table capacity requirement and a time delay requirement, and a corresponding number N+1 of pipeline levels is set according to the maximum height; and the maximum number of required nodes of a tree structure of each layer is defined according to an algorithm filling condition, a corresponding memory space is set according to the maximum number of nodes, and finally a memory space of a result table is set according to the actual routing table capacity requirement.

The so-called growing from bottom to top refers to that a initial node is allocated at the bottom layer LVn (209) of a node layer during a dynamic insertion process of the B-tree, in the meanwhile, since the initial node is a root node, it is necessary to write an address of the root node into a root node address memory (207). When the root node changes during a process of updating a routing entry, the address of the root node needs to be updated synchronously by software, thereby ensuring normal operation of lookup pipelines.

Figure 7:
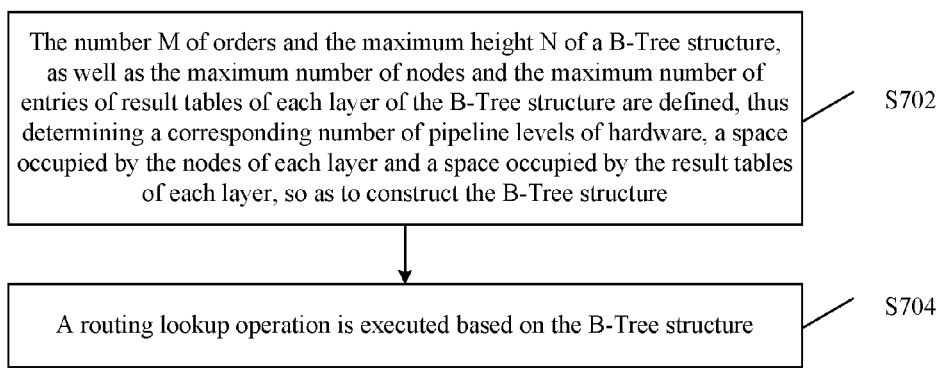
FIG. 7 is a flowchart of a routing lookup method according to an embodiment of the disclosure.

Based on the analysis, the disclosure provides a routing lookup method. FIG. 7 is a flowchart of a routing lookup method according to an embodiment of the disclosure. As shown in FIG. 7, the flow includes the following steps (Step 702 to Step 704).

Step 702: The number M of orders and the maximum height N of a B-Tree structure, as well as the maximum number of nodes and the maximum number of entries of result tables of each layer of the B-Tree structure are defined, thus determining a corresponding number of pipeline levels of hardware, a space occupied by the nodes of each layer and a space occupied by the result tables of each layer, so as to construct the B-Tree structure.

Step 704: A routing lookup operation is executed based on the B-Tree structure.

Figure 8:
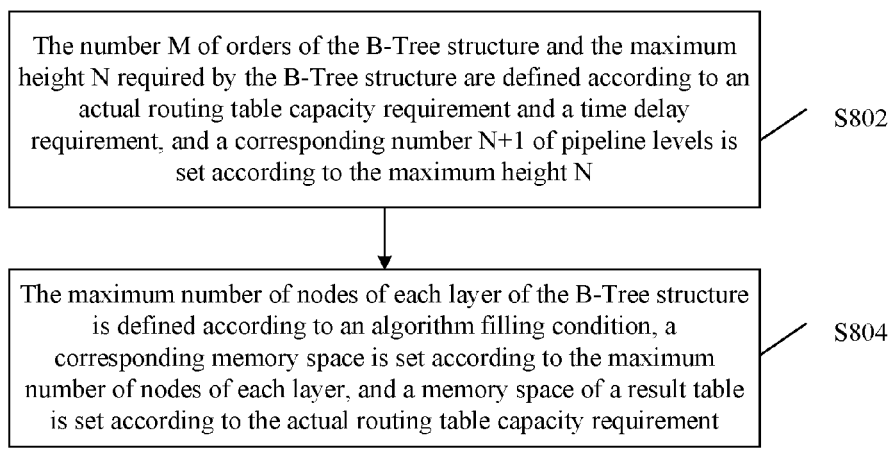
FIG. 8 is a flowchart of a method for constructing a B-Tree structure having a hardware lookup structure growing from bottom to top according to an embodiment of the disclosure.

Based on the analysis, the disclosure provides a method for constructing a B-Tree structure having a hardware lookup structure growing from bottom to top. FIG. 8 is a flowchart of a method for constructing a B-Tree structure having a hardware lookup structure growing from bottom to top according to an embodiment of the disclosure. As shown in FIG. 8, the flow includes the following steps (Step 802 to Step 804).

Step 802: The number M of orders of the B-Tree structure and the maximum height N required by the B-Tree structure are defined according to an actual routing table capacity requirement and a time delay requirement, and a corresponding number N+1 of pipeline levels is set according to the maximum height N.

Step 804: The maximum number of nodes of each layer of the B-Tree structure is defined according to an algorithm filling condition, a corresponding memory space is set according to the maximum number of nodes of each layer, and a memory space of a result table is set according to the actual routing table capacity requirement.

Figure 9:
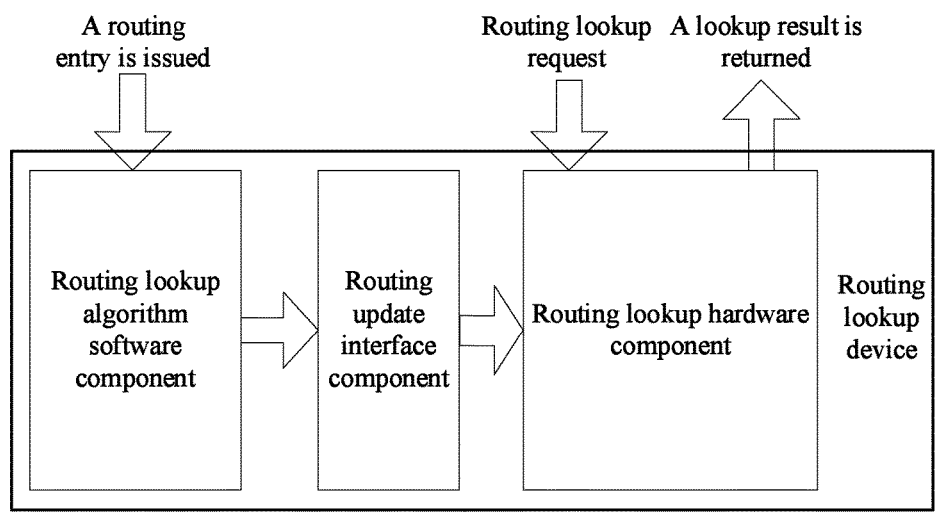
FIG. 9 is an operation diagram of a routing lookup device according to an embodiment of the disclosure.

In the technical solution of the disclosure, a routing lookup device includes three parts, i.e. a lookup algorithm software component, a routing update interface component and a routing lookup hardware component. FIG. 9 is an operation diagram of a routing lookup device according to an embodiment of the disclosure. As shown in FIG. 9, a lookup algorithm software component completes software calculation for a routing entry and issue an entry update instruction, a routing update interface component controls, after receiving the entry update instruction, a data stream of the routing lookup hardware component according to an actual working state of the routing lookup hardware component, and writes an updated entry into a memory of the routing lookup hardware component, and the routing lookup hardware component is of a pipeline architecture, responds to a routing lookup request of a hardware system, and returns to the hardware system a lookup result having a longest prefix matching.

A specific implementation mode of the disclosure includes three steps as follows: the first step includes that the number M of orders of a B-Tree structure, the height N of the tree structure, as well as the number of nodes and the number of entries of result tables of each layer are determined according to an actual requirement, thus determining a corresponding number of pipeline levels of hardware, a space occupied by the nodes of each layer and a space occupied by the result tables of each layer; the second step includes that a lookup algorithm software component, a routing update interface component and a routing lookup hardware component are designed according to a framework designed by the first step; and the third step includes that the components implemented in the second step are combined into a routing lookup system according to an actual application scenario and the routing loop up system is connected to a routing forwarding system, wherein the routing lookup algorithm software component may operate on a CPU of the routing lookup system, hardware related components (the routing update interface component and the routing lookup hardware component) may be implemented in a Field-Programmable Gate Array (FPGA) or an Application Specific Integrated Circuit (ASIC) chip, and connected by a hardware data interface in the actual application scenario, such as a common Interlaken-Lookaside interface in the routing forwarding system. The software component and the hardware components may be but not limited to be connected by a standard LocalBus or PCIe interface.

It may be learned from the description above that the technical solution of the disclosure designs a software algorithm component, a hardware data structure, an updating flow, a lookup pipeline structure and a memory structure of a routing lookup system as a whole, thus requirements of high performance lookup of a large capacity routing table can be satisfied, a hardware pipeline operation can be implemented with less pipeline levels, and the capacity is not sensitive to distribution of routing prefixes.

Although the example embodiments of the disclosure have been disclosed as examples, those skilled in the art will realize that various improvements, additions and replacements are also possible. Therefore, the scope of the disclosure should not be limited to the embodiments above.

INDUSTRIAL APPLICABILITY

The technical solution provided by the embodiments of the disclosure may be applied in the field of network switch and designs a software algorithm component, a hardware data structure, an updating flow, a lookup pipeline structure and a memory structure of a routing lookup system as a whole, thus requirements of high performance lookup of a large capacity routing table can be satisfied, a hardware pipeline operation can be implemented with less pipeline levels, and the capacity is not sensitive to distribution of routing prefixes.

What is claimed is:

1. A routing lookup device, comprising a routing lookup algorithm software component, a Central Processing Unit (CPU), a routing update interface component and a routing lookup hardware component, wherein the routing lookup algorithm software component is executed by the CPU to execute software calculation for a routing entry and issue an entry update instruction;

the routing update interface component is configured to control, after receiving the entry update instruction issued by the routing lookup algorithm software component, write an updated entry into a memory of the routing lookup hardware component, and the routing lookup hardware component is configured to respond to a routing lookup request of a hardware system, and return to the hardware system a lookup result having a longest prefix matching, wherein the routing lookup hardware component is of a pipeline architecture;

wherein the routing lookup algorithm software component comprises:

an inserting operation sub-component, configured to respond to a routing insertion instruction of a routing forwarding system, and insert a routing entry into a Balance-Tree (B-Tree) structure;

a deleting operation sub-component, configured to respond to a routing deletion instruction of the routing forwarding component, and delete the routing entry from the B-Tree structure;

a software table entry memory management sub-component, configured to manage node data in a routing lookup algorithm and entry data of a result table; and an update hardware operation sub-component, configured to record in a cache, a B-Tree node and a result table entry changed in an inserting operation of the inserting operation sub-component or a deleting operation of the deleting operation sub-component, convert a software data format of the tree node into a hardware data format after the inserting operation or the deleting operation, and successively write converted hardware data and a corresponding hardware mapping address into the routing update interface component through a software and hardware interaction interface.

2. The device as claimed in claim 1, wherein the routing lookup hardware component comprises: a lookup logic sub-component and a memory sub-component, wherein the lookup logic sub-component is configured to transmit root node address information in the memory sub-component and lookup key value information to a lookup pipeline of a first level of a tree structure after receiving the routing lookup request of the hardware system, then judge whether a root node address is an address of a node of a current level, and when a judgment result is that the root node address is the address of the node of the current level, initiate a node reading request to the memory sub-component and wait for the memory sub-component to return node information, and when the judgment result is that the root node address is not the address of the node of the current level, keep current node information unchanged and access a pipeline of next level; and when the judgment result is that the root node address is the address of the node of the current level, the lookup logic sub-component is further configured to compare the node information with a key value, to judge whether a routing entry is hit, and when a judgment result is that the routing entry is hit, replace a previous hit result with a record result corresponding to the hit routing entry; and the memory sub-component comprises a plurality of independent memory spaces respectively corresponding to lookup logic layers of the tree structure.

3. The device as claimed in claim 2, wherein the routing update interface component comprises:

a cache sub-component, configured to receive node data, result table entry data and a corresponding hardware mapping address through the software and hardware interaction interface; and a logic processing sub-component configured to update, according to a working state of the lookup logic sub-component of the routing lookup hardware component, an entry update content of the cache sub-component into the memory sub-component of the routing lookup hardware component.

4. The device as claimed in claim 1, wherein the inserting operation sub-component comprises:

a tree structure management element, configured to control an access sequence of new entries in the B-Tree structure;

a node parsing and comparison element, configured to control an ordered query of the new entries in the B-Tree structure together with the tree structure management element, and find an insertion position;

a node splitting operation element, configured to split, when a new entry needs to be inserted into a full node, the full node; and a result table update element, configured to store result information carried by the new entry into a result table, and record an address of the result information in a corresponding position of a node where the new entry locates.

5. The device as claimed in claim 1, wherein the software table entry memory management sub-component comprises:

a software node management element, configured to manage node allocation in the routing lookup algorithm and rapidly allocate and manage a software node through a memory management algorithm;

a software result table management element, configured to manage entry address allocation of a result table in the routing lookup algorithm and rapidly allocate and manage the result table through the memory management algorithm; and a hardware address mapping management element, configured to perform software address mapping for an actual memory space of hardware, and manage a hardware node and a result table according to a memory management algorithm of software, wherein software nodes are in one-to-one correspondence with hardware nodes, and software result tables are in one-to-one correspondence with hardware result tables.

6. A routing lookup method, comprising:

defining the number M of orders and a maximum height N of a Balance-Tree (B-Tree) structure, as well as the maximum number of nodes and the maximum number of entries of result tables of each layer of the B-Tree structure, determining a corresponding number of pipeline levels of hardware, a space occupied by the nodes of each layer and a space occupied by the result tables of each layer, to construct the B-Tree structure; and executing a routing lookup operation based on the B-Tree structure.

7. A method for constructing a Balance-Tree (B-Tree) structure having a hardware lookup structure growing from bottom to top, the method comprising:

defining, according to an actual routing table capacity requirement and a time delay requirement, the number M of orders of the B-Tree structure and a maximum height N required by the B-Tree structure, and setting a corresponding number N+1 of pipeline levels according to the maximum height N; and defining the maximum number of nodes of each layer of the B-Tree structure according to an algorithm filling condition, setting a corresponding memory space according to the maximum number of nodes of each layer, and setting a memory space of a result table according to the actual routing table capacity requirement.

* * * * *